Feb. 7, 1956  I. E. COFFEY  2,734,009

DIAPHRAGM AND MATERIAL FOR MAKING SAME

Original Filed Dec. 9, 1946  5 Sheets-Sheet 1

INVENTOR.
IRVEN E. COFFEY
BY George R. Ericson
ATTORNEY

Feb. 7, 1956     I. E. COFFEY     2,734,009
DIAPHRAGM AND MATERIAL FOR MAKING SAME
Original Filed Dec. 9, 1946     5 Sheets-Sheet 2
LESS CRIMP
FIG. 5.
GREATER CRIMP
FIG. 6.
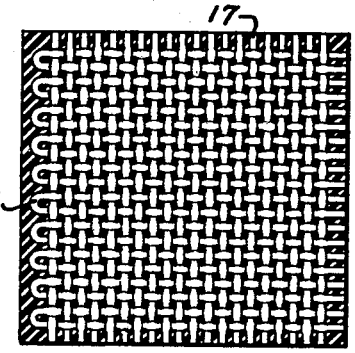
FIG. 8.
FIG. 7.
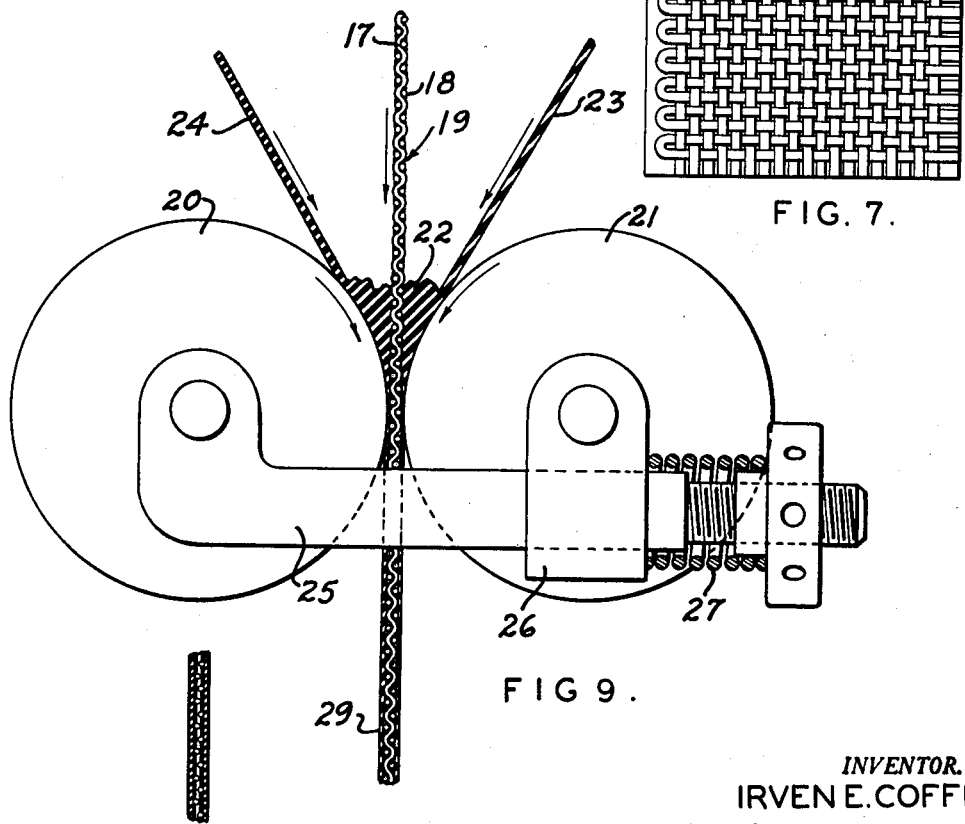
FIG 9.
FIG. 10.
INVENTOR.
IRVEN E. COFFEY
BY George R. Ericson
ATTORNEY Feb. 7, 1956 I. E. COFFEY 2,734,009
DIAPHRAGM AND MATERIAL FOR MAKING SAME
Original Filed Dec. 9, 1946 5 Sheets-Sheet 3

INVENTOR
IRVEN E. COFFEY
BY
ATTORNEY

Feb. 7, 1956  I. E. COFFEY  2,734,009
DIAPHRAGM AND MATERIAL FOR MAKING SAME
Original Filed Dec. 9, 1946  5 Sheets-Sheet 4

INVENTOR
IRVEN E. COFFEY
BY *George R. Ericson*
ATTORNEY

United States Patent Office 2,734,009
Patented Feb. 7, 1956

2,734,009

DIAPHRAGM AND MATERIAL FOR MAKING SAME

Irven E. Coffey, Clayton, Mo., assignor to Carter Carburetor Corporation, St. Louis, Mo., a corporation of Delaware Original application December 9, 1946, Serial No. 715,040, now Patent No. 2,595,127, dated April 29, 1952. Divided and this application September 28, 1951, Serial No. 248,680

6 Claims. (Cl. 154—50)

This invention relates to diaphragms and particularly to diaphragms for fuel pumps and the like. An important use of the diaphragm is in connection with fuel pumps for pumping the gasoline in internal combustion engines such, for instance, as the pump disclosed in my Patent No. 2,426,965, issued September 2, 1947. This is a division of my copending application, Serial No. 715,040, filed December 9, 1946, now Patent No. 2,595,127. Certain features of the invention are shown in my copending application Serial No. 540,464, filed June 15, 1944, now abandoned, a division of which is now Patent No. 2,422,529, directed to a process of making diaphragm fabric.

In fuel pumps of this type the pump and diaphragm are subjected to severe strains under wide variations of temperature and exposed to liquids and gases, including gasoline, benzine, alcohol, water, and others, which are likely to attack and weaken or destroy the coating material on the diaphragm. I make this diaphragm on a cloth base and coat or impregnate it with a material, such as synthetic rubber, which is resistant to the action of the gasoline or other liquid which is to be pumped. One of the conditions required of the diaphragm is that it must remain flexible enough to permit distortion into a substantially frusto-conical and split doughnut shape by the diaphragm operating means while the edges of the diaphragm are rigidly held. The service required of diaphragms in fuel pumps for automotive engines is severe, as they have to operate at high speed under considerable and sharply varying tension for thousands of hours during the life of the car. For this reason, considerable diaphragm trouble has been experienced by fuel pump manufacturers in spite of such expedients as multiple thickness and multiple layer diaphragms. Up to the time of this invention, it has been impossible or impractical to obtain a satisfactory diaphragm, particularly of the single layer, rubber coated type which is most desirable for fuel pump use.

I have found that Buna-N rubber has good qualities of resistance to the action of the liquids named and is not too seriously affected by the ranges of temperature in which an internal combustion engine fuel pump must operate, namely, 50° below zero to 300° Fahrenheit. On the other hand, this material has comparatively little tensile strength, not nearly sufficient to permit its use in forming a diaphragm without re-enforcement, and there has been no satisfactory solution of the problem of applying, connecting, and correlating a satisfactory re-enforcing material to the Buna-N rubber. For instance, if the yarn or cords of the cloth used as the re-enforcing material are impregnated with the rubber, the finished diaphragm becomes stiff and frangible. On the other hand, if the rubber is not bonded to the fabric, it is likely to strip off or form blisters which rapidly increase in size and result in eventual failure of the diaphragm. It will be understood, of course, that no real bonding of the rubber to the fabric is possible without impregnation of the yarn and bonding together of the individual fibres thereof, and where the yarn or cords are thus impregnated, proper slippage between the fibres is prevented, so that the finished diaphragm soon breaks down under severe use.

On account of the above described dilemma, it has previously been considered impractical to use synthetic rubber diaphragms for fuel pumps, but I have found that a satisfactory diaphragm of this type can be made in accordance with the invention described herein, and that such diaphragms meet all the necessary requirements for automotive fuel pump services.

First, I select a relatively open weave base fabric having a weave in the order of twenty threads per inch and the weight of 12 ounces per square yard. The cords of the fabric may be formed of four yarns twisted together, and the twisting and weave are such that the resulting fabric, if made of cotton, has a micrometer thickness of approximately $\frac{1}{32}''$, under pressure of approximately 25 pounds per square inch. One such fabric available for the purpose is commercially known as chafer duck.

In accordance with this invention, I apply uncured Buna-N rubber to both sides of this material by passing it through calender rolls, using such pressure as to stretch the fabric in the direction of the warp threads from 5% to 10%. This refers to the stable condition of the fabric after it has passed through the rolls and not to the amount to which it is actually stretched while passing through the rolls. The fabric is slightly reduced in the direction of the weft threads in this operation.

For convenience in calendering, it may be desirable to give the material a prime coat on both sides with a thinner mastic of Buna-N or other synthetic rubber dissolved in methyl-ethyl-ketone, and permit this to dry before applying the main coats, but this should not be thin enough to cause impregnation of the cords. The application of this prime coat superficially bonded to both surfaces of the cloth provides an adhesive surface to which the main coat of rubber will adhere in calendering.

After calendering, the cloth is cut longitudinally in strips slightly wider than the finished diaphragm, which in a particular case is approximately four inches, and then cured between flat platens about two feet long and four inches wide which are brought together slowly at a temperature of about 300° to 315° Fahrenheit, the pressure eventually applied being approximately 750 pounds per square inch. I bring the platens together slowly during the last few thousandths of an inch of travel and the slow building up of the pressure causes the rubber to tend to flow outwardly as in a conduit, and since the distance is shorter to the side of the platen than to the end, there is a stretching action sideways tending to equalize the tension on the warp and weft.

During this process, the rubber is forced through the interstices of the weave from both sides, and since the rubber is highly viscous, it tends to force the fluff or loose projecting fibers back into the cord, so that the interstices are opened up and the cords are reduced to a dimension of approximately $\frac{1}{100}''$ in diameter. This opens up the interstices and permits the rubber flowing from the opposite sides to meet and bond in the center of the cloth, so that each one of the interstices is filled with a roughly square spool-shaped plug which is provided on each end with a poppet-valve-shaped head formed by the surface layer of the cloth. The actual surface layer should not be more than .015" to .030" in thickness, while the dimension across the smallest portion of the plugs in the middle of the cloth will be from .025" to .040".

For this reason, any failures in the surface layers of the rubber cannot result in failure of the diaphragm, because each of the interstices is filled with a self-closing valve which merely tends to close tight, as a check valve or poppet valve, when the pressure tends to force the liquid through the cloth.

By this means also I provide a diaphragm in which the individual cords are substantially separated and yet not impregnated. Also, the cords preserve a substantial curvature or crimp so as to permit substantial stretching in the use of the diaphragm.

The main object of the present invention is to provide a new and improved diaphragm which will be capable of handling internal combustion engine fuel and lasting the full life of the engine with which it is to be used.

A further object of my invention is to provide a new and improved method of treating fabric and particularly woven fabric for the purpose of adapting it for use in the making of diaphragms.

It is a further object of this invention to provide a new and improved rubber coated cloth diaphragm in which the surface coatings of rubber are joined together by rivets extending through the interstices of the weave and in which the diameter of such rivets is at least as great as the thickness of the surface layer of rubber.

It is a further object of this invention to produce a new and improved rubber coated cloth pump diaphragm material in which the yarn of the cloth has its individual fibers encased in a thin coating of rubber and in which the individual cords of the fabric are precast and separated from each other in a crimped position prior to the application of the surface coating of the rubber.

It is a further object of the invention to produce a rubber coated cloth or fabric diaphragm in which the stretch and crimp of the cords of the warp and weft are equalized before the final curing of the rubber.

It is a further object of the invention to produce a diaphragm of the above described character having equal stretching qualities in the direction of the warp and weft.

It is another object to provide a new method for forming diaphragms in which the strains applied in distorting the diaphragm during use will be evenly resisted by the threads of the fabric base.

It is another object to provide a new method for forming diaphragms of the coated fabric type in large quantities while maintaining high standards of durability and strength.

It is still another object to provide novel means for forming diaphragms of the coated fabric type in which the coating and curing operations stretch the longitudinal and transverse threads by equal amounts so that the threads in the finished diaphragm will be equally spaced and tensioned so as to uniformly carry the strain incident to use of the diaphragm.

These objects and other objects hereafter appearing are attained by the method illustrated in the accompanying drawings in which Fig. 1 shows a diaphragm, according to my invention, mounted in a fuel pump of the type shown in said Patent No. 2,426,965, issued September 2, 1947.

Fig. 5 shows a longitudinal sectional view of the fabric after the application of a preliminary coat of rubber to each side.

Fig. 6 shows a transverse sectional view of the fabric with the preliminary coating.

Fig. 7 is a sectional plan view of the material after the application of the uncured rubber before pressing and curing.

Fig. 8 is a sectional plan view showing the material after the final application and curing of the synthetic rubber, the top layer of rubber being removed for inspection of the fabric and the central portion of the rivets.

Fig. 9 shows the application in a calender of the synthetic rubber to the precoated fabric, the section of the fabric being taken along a warp thread.

Fig. 10 shows a section of the fabric as it comes from the calender, the section being taken between the warp threads.

Figure 2:
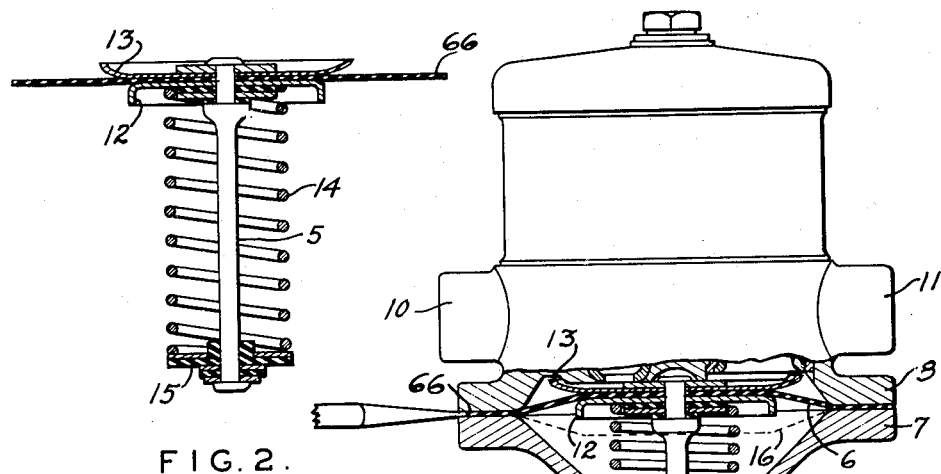
Fig. 2 shows a sectional elevation of a diaphragm assembly separate from the pump.

The reference numeral 1 indicates the main body member of the fuel pump having a flange 2 by means of which it is adapted to be mounted on an internal combustion engine, or machine, to which it is to be attached. Operating lever 3 normally yieldingly held in the position shown by the spring 4 is connected to the diaphragm shaft 5 by a one way connection which has no bearing on the present invention and is not shown herein. The full structural details of the pump are shown in my above mentioned co-pending application. The flexible diaphragm 6 is mounted between flanges 7 and 8 and may be provided with perforations 9 to receive the flange bolts or rivets. The pump is provided with an inlet 10 and an outlet 11, together with suitable valves for controlling the inlet and outlet. The central part of the diaphragm 6 is rigidly clamped between the washers 12 and 13, which are especially shaped as shown herein and as claimed in my Patent No. 2,426,965. An operating spring 14, held in place between the washers 12 and 15 serves to maintain a constant discharge pressure for the pump.

Figure 1:
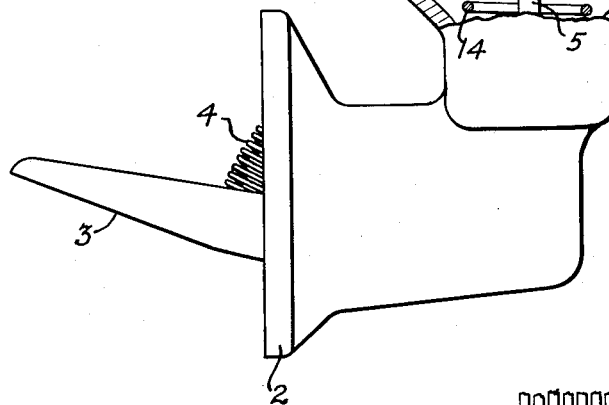

During the maximum intake stroke of the pump, the diaphragm is shifted from the position shown in Fig. 1, first, to the flat position corresponding to Fig. 2, and, finally, to a position corresponding to the dotted lines 16 shown in Fig. 1. This requires the diaphragm to be not only flexible, but slightly resilient and since the reciprocating action of the diaphragm must be very rapid under certain conditions, heavy strains are imposed due to the inertia of the liquid which must be accelerated and decelerated in the up and down movement of the diaphragm. As stated above, the object of this invention is to provide a means and method for producing a diaphragm having the strength and resilience required to function durably in the above described manner.

Figure 4:
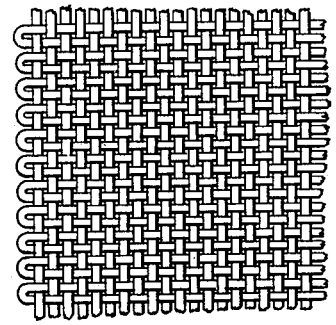
Fig. 4 is a plan view showing the weave of the fabric upon which my diaphragm is based.
Figure 11:
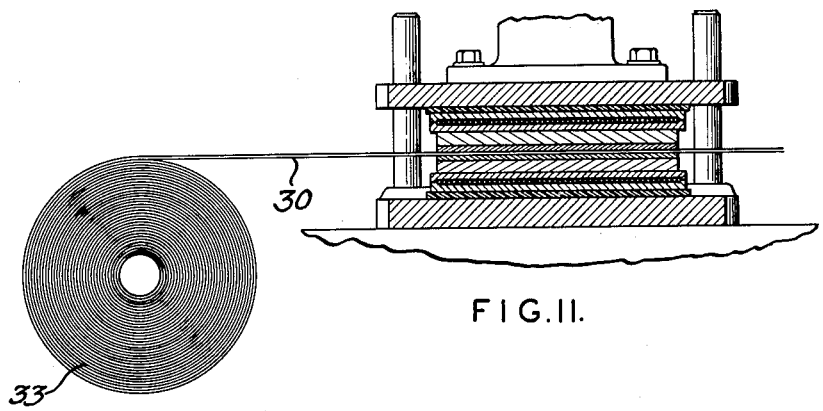
Fig. 11 is a sectional view on a reduced scale of a press used in curing the coated fabric after the coated sheet has been cut into strips.
Figure 12:
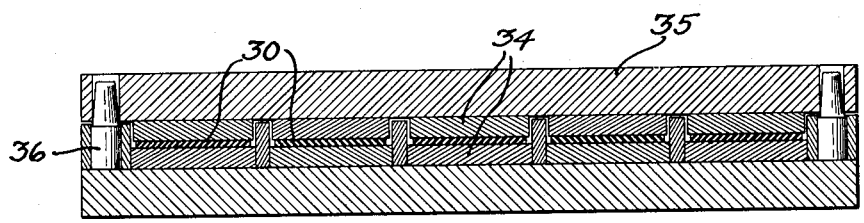
Fig. 12 shows a number of strips of the coated fabric applied to the curing press.
Figure 13:
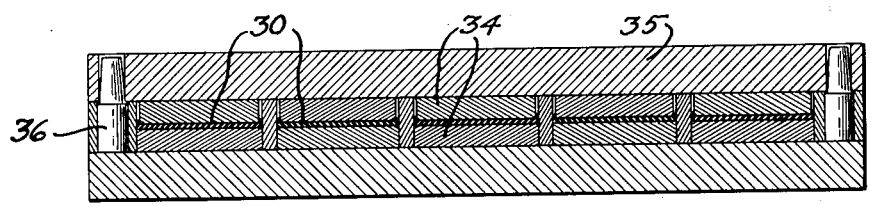
Fig. 13 is a view similar to Fig. 12, but after the pressure and heat have been applied to the coated strips.

I have shown in Fig. 4, considerably magnified, a sheet of duck fabric which serves as the base material for the diaphragm. The warp and weft are suitably made of four-thread yarn spaced from sixteen to twenty-five cords to the inch and equally spaced and tensioned in both directions. Cotton duck has proven to be most satisfactory, but other fibres such as rayon or nylon may be used.

The proper selection and weaving of the fabric is important, and I therefore give the following example of a material which has been found to be suitable for the purpose:

Weight: 12 ounces per square yard.
Thread count of cloth before processing: Warp 20—Weft 20 (limits 19–21 but must be square within 1 count).
Yarn: 4 ply.
Thickness: .037 to .041.
Micrometer thickness: .025.
Crimp: Warp 14 to 18%—Weft 6 to 10%.

The calendering is preferably done in the direction of the warp, and this operation stretches out the crimp to such an extent as to cause unevenness in the final material and breakage which might even occur during the calendering process, except for the provision of substantial crimp to allow the cloth to stretch during calendering.

Buna-N or other suitable plastic material is first applied as a base coat in relatively thin state by means of a scraper. The cloth is then passed in the direction of the warp between calendering rolls 20 and 21 which are supplied with uncured synthetic rubber in a somewhat thicker condition. As indicated at 22, the rubber builds up a gob in advance of each roll. This gob is continuously supplied by means of the uncured Buna-N rubber strips 23 and 24 which are fed into the gob as required. The base coating forms an adhesive surface which prevents the thick Buna-N mastic material from sticking to the rolls.

Buna-N type synthetic rubber is especially suitable for the coating material as it resists deterioration and remains flexible and imperforate when exposed to fuels having high aromatic content. The material is a copolymer of butadiene and acrylonitrile with plasticizer, carbon black, and other ingredients in minor proportions, as is well known to rubber chemists. The exact formula of the material is not essential.

Suitable spacing and tension of the rolls is provided by a mounting which is diagrammatically indicated at 25 and 26 with adjustable spring means 27 for controlling the pressure and spacing. The pressure is sufficient to press the uncured rubber into the surfaces of the fabric, but not sufficient to press it through the interstices between the threads, or to form the nodules which push the fuzz back into the yarn and join in the middle, as this must be reserved for the curing, pressing and tension balancing operation. It is important, also, that the threads themselves be not impregnated, as is the case when the fabric is dipped in the rubber material in a liquid or soft state.

During the rolling operation, the resistance of the gob or gobs 22 to passing through the rollers sets up a very substantial tension tending to stretch the warp or longitudinal threads along the direction of rolling and separate the weft.

Figure 20:
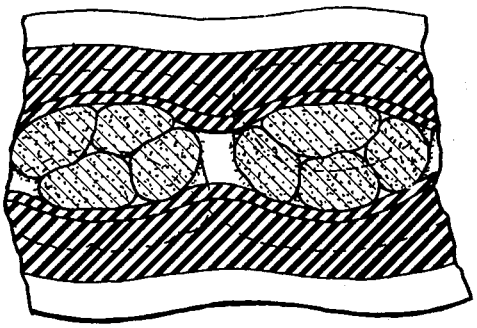
Fig. 20 is a magnified section similar to Figs. 18 and 19 after the application of the main coating but before pressing and curing.
Figure 22:
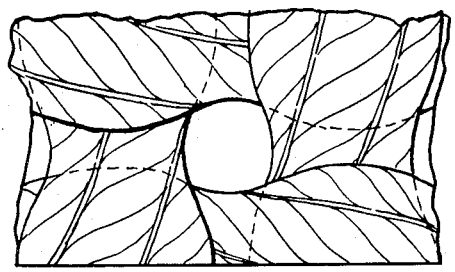
Fig. 22 shows a plan view similar to Fig. 17 except that the change of shape and position of the cords due to pressing and curing is shown.
Figure 21:
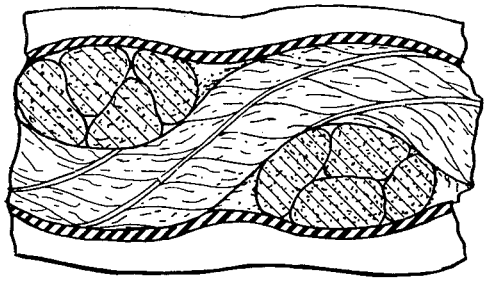
Fig. 21 is a view similar to Fig. 19 except that the cross section is taken substantially on line 21—21 of Fig. 17.
Figure 23:
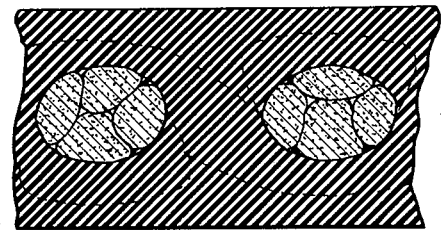
Fig. 23 is a cross sectional view similar to Figs. 18, 19 and 20 except that it is taken after pressing and curing and shows the changed condition of the cords.
Figure 24:
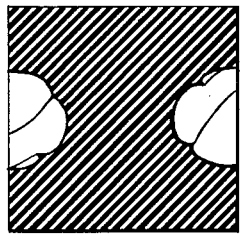
Fig. 24 is similar to Fig. 23 except that it shows a single rivet or double headed plug comprising sections of the two surface layers joined by the hour glass shaped portion extending through the opening which is formed in the weave during the process, the cords being removed.
Figure 25:
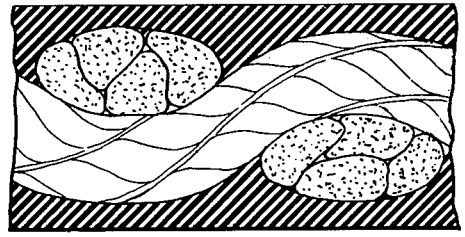
Fig. 25 is similar to Fig. 23 except that the section is taken along the line of the cord instead of between the cords.

The uncured rubber is thus rolled into the surfaces of the cloth which is simultaneously stretched approximately 5% or more in the direction of the warp. The two surface layers, however, are not joined in the middle, because the rubber in its comparatively cool condition cannot be forced into the interstices without applying such pressure as to tear the cloth, and the condition of the cloth after calendering is as shown in Fig. 20.

Figure 14:
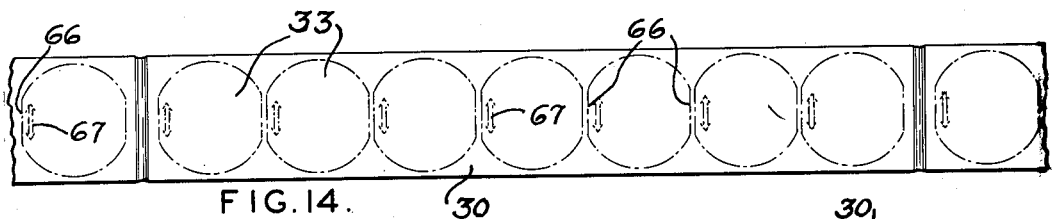
Fig. 14 shows the method of cutting diaphragm disks from the coated and cured strips.

The coating material is cured by the application of heat and stationary pressure, as illustrated in Figs. 11, 12, 13, 15 and 16. The calendered sheet of coated fabric is cut into longitudinal strips 30 slightly wider than the diameter of the diaphragm, as indicated in Fig. 14. These strips are mounted in rolls 33 and fed between the opposed plates 34 of a heating press 35, the plates being of substantial length, that is, at least as long as the diameters of several diaphragms, and preferably 24 to 36 inches long, the width of a particular design being 4 inches. Sufficient heat and pressure are applied to cure the synthetic rubber material and to stretch the weft threads so that in the finished product, both longitudinal and transverse threads are at the same tension and equally spaced. In practice, a pressure of 750 pounds per square inch and temperature of from 307 to 310° Fahrenheit are applied from 10 to 15 minutes. Shouldered press guides 36 provide stops so that the finished product will be reduced in thickness to between .055 and .065 inch, with a layer of synthetic rubber .010 to .020 inch thick on both sides of the cloth. The press is constructed so that pressure is applied very slowly which causes the coating to be spread evenly and gas pockets and dimples eliminated. Too rapid application of the curing pressure in some instances has damaged or broken the threads of the base fabric, whereas the slow application of pressure preserves the full strength of the threads.

Figure 16:
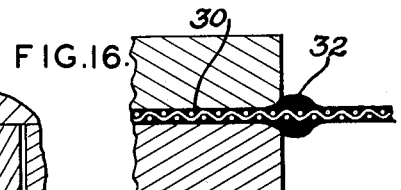
Fig. 16 is a corner sectional view of one of the presses with exuded plastic material.
Figure 15:
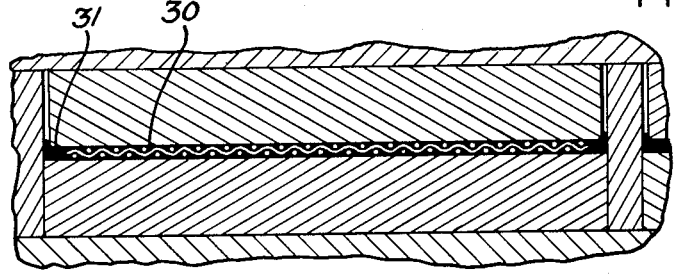
Fig. 15 is an enlargement of one of the pressing sections of Fig. 13.
Figure 17:
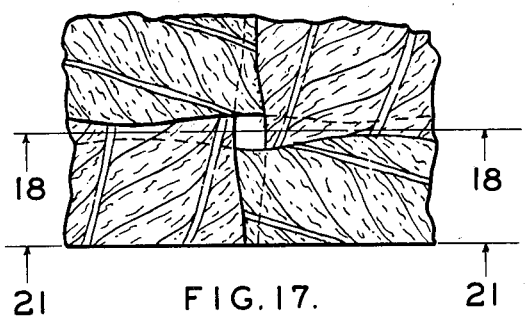
Fig. 17 shows a magnified plan view of a portion of the original cloth before any coating is applied.
Figure 18:
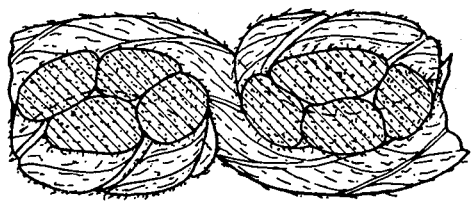
Fig. 18 is a magnified cross section showing the cords of the cloth taken substantially on line 18—18 of Fig. 17.
Figure 19:
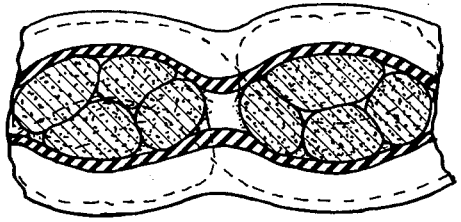
Fig. 19 shows a magnified section similar to Fig. 18 after the application of the preliminary coating.

Figs. 15 and 16 illustrate how the synthetic rubber is forced out sidewardly from the strips as at 31 and 32 causing transverse stretching of the fabric to compensate for the longitudinal stretching during calendering. Substantially no longitudinal stretching occurs during this curing operation because of the tighter condition of the longitudinal threads and the substantial length of the press, the excess coating tending to escape along the lesser and more elastic dimension while stretching the threads in that direction.

The crimp and tension of the weave, the quantity of synthetic rubber applied, the rate of applying the curing pressure, and the positioning of the press stops all affect the amount of stretching of the threads and these must be adjusted so that the finished product is of equal strength and resiliency in all directions. The specifications noted have been found practical, but some variations may be found to be permissible in practice. The condition of the cured sheet can be readily discovered by applying measured stretching forces and stretch and rupture measuring devices. Since most or all of the stretching during curing occurs in the short or transverse direction, the dimension can be varied by varying the rate of application of pressure, or the viscosity of the synthetic rubber until the resultant product is at balanced tension.

Figure 3:
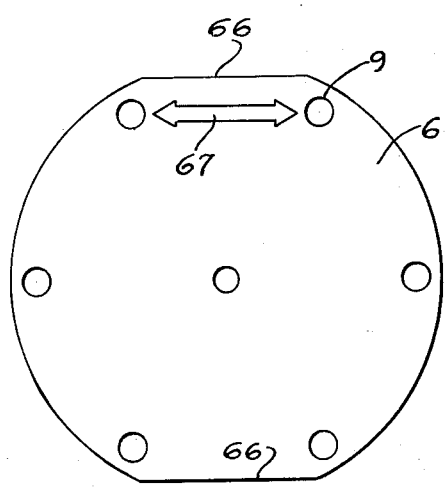
Fig. 3 is a plan view of a single diaphragm as shown in Figs. 1 and 2.

The coated and cured strips are then cut or stamped, as shown in Fig. 14, to form the diaphragm disks 33 and finally, the individual disks are perforated, as in Fig. 3, to provide bolt holes 9 and a center hole for attachment to the flanges 7 and 8 of the pump and the diaphragm operator.

For convenience in inspection and testing of diaphragms as well as to determine the proper position of the diaphragm in certain applications where a difference between the tension of the warp and weft is desired or permissible, I provide indicating means to show the direction of the weft. This indicating means may be nothing more than the flat sides indicated at 66. The reason for this is that there are some applications in which some excess flexibility is required in one direction, as, for instance, when the operation of the diaphragm by the members 3, 5, and 12 causes a tilting action. While there is normally very little difference between the stretching of the warp and weft in diaphragms constructed according to this process, it is possible to emphasize the difference to any desired extent by controlling the rate of application of pressure in the molds and by proper selection of crimp differential in the cloth. Ordinarily, I provide a printed mark which may be formed in raised letters integral with the rubber, such as indicated at 67, which also serves as an indication of the direction of the weft.

The cut-away portion 66 has the additional function of providing an open crevice between the flanges 7 and 8 into which the tips of screw drivers may be inserted as indicated in Fig. 1. It will be understood that the flanges are held together by great forces during operation, and subjected to high temperatures. This causes the diaphragm to adhere to the metal surfaces of the flanges so that substantial force has to be applied to separate them. The provision of open crevices between the flanges as shown permits the exertion of the necessary force without injury to the diaphragm or the flanges.

The resulting product, accordingly, is a strong durable, resistant diaphragm having uniform properties of flexibility, strength, and resiliency in all directions. Diaphragms according to the present invention, when tested to destruction, break along lines intersecting at right angles, indicating equal strength in both directions. Moreover, diaphragms as constructed in this manner have withstood life tests of 10,000 hours of operation at 1750 cycles per minute when mounted in the type of pump illustrated in Fig. 1. The Buna-N coating will withstand temperatures down to 70° Fahrenheit below zero without losing flexibility and is not materially affected by aromatic or other hydro-carbon fuels, alcohols, or water, whereas previous types of diaphragms have proven unserviceable under some or all of the above conditions. The base fabric threads are mechanically bonded to the coating material by being firmly encased or embedded therein without impregnation thereby. Thus, these threads retain their pliability and tensile strength for a long time.

The invention may be modified as will occur to those skilled in the art and the exclusive use of all modifications as come within the scope of the appended claims is contemplated.

I claim:

1. A diaphragm material capable of numerous, rapidly successive flexings comprising a cloth base having substantial, uniform tensile strength in all directions and a thermoplastic coating, said coating consisting of an imperforate layer on each side of the cloth base, and having integral projections extending through interstices in the cloth base, the cross sectional dimension of said projections being at least as great as the thickness of the coating between the outer surface and the cloth.

2. A diaphragm material capable of numerous, successive flexings comprising a chafer duck base having a weave of approximately twenty threads per inch, the individual threads being coated but not impregnated or bonded together with symthetic rubber, and imperforate surface layers of synthetic rubber superposed upon and conforming to but not bonded to the threads of the fabric, said layers being mechanically bonded together and to said threads by integral projections extending through the interstices of the cloth and firmly gripping said threads.

3. A diaphragm material comprising a chafer duck base having a weave of approximately twenty threads per inch, the individual threads being coated but not impregnated or bonded together with synthetic rubber, and imperforate surface layers of synthetic rubber superposed upon and conforming to but not bonded to the threads of the fabric, said layers being mechanically bonded together and to said threads by integral projections extending through the interstices of the cloth and, with said surface layers, embedding said threads, said projections each having a transverse dimension at least equal to the thickness of the surface layer of rubber.

4. A fuel pump diaphragm comprising a sheet of textile fabric having substantial, uniform tensile strength in all directions with cured synthetic rubber firmly encasing but not penetrating the fabric threads for mechanical bonding thereto, said rubber forming opposite, imperforate surface layers and hour-glass shaped connections extending into all of the interstices of the fabric.

5. A coated fabric comprising a chafer duck base covered on both sides with surface layers of synthetic rubber, said layers being bonded together by integral projections which extend through interstices in the weave, the cross sectional dimensions of said projections at their central portions being at least as great as the thickness of one of said surface layers.

6. A coated fabric comprising a chafer duck base, the interstices in the weave of said base being filled with rubber plugs, the ends of each plug being provided with flanged heads, said heads being joined together by a surface layer of rubber of insufficient strength to pull the plugs out of the fabric when the surface layer is torn from the cloth.

References Cited in the file of this patent

UNITED STATES PATENTS

| | | |
|---|---|---|
| 959,178 | Streat | May 24, 1910 |
| 989,967 | Headson | Apr. 18, 1911 |
| 1,617,604 | Mills et al. | Feb. 15, 1927 |
| 1,928,356 | Haertel | Sept. 26, 1933 |
| 2,000,542 | Wasson | May 7, 1935 |
| 2,241,056 | Chilton | May 6, 1941 |
| 2,342,802 | Hendley | Feb. 29, 1944 |
| 2,355,038 | Barnard | Aug. 1, 1944 |
| 2,474,201 | Raymond et al. | June 21, 1949 |

FOREIGN PATENTS

| | | |
|---|---|---|
| 894,726 | France | Mar. 20, 1944 |